United States Patent
Pfeifer et al.

(10) Patent No.: US 8,278,236 B2
(45) Date of Patent: Oct. 2, 2012

(54) METHOD FOR CATALYTICALLY COATING CERAMIC HONEYCOMB BODIES

(75) Inventors: Marcus Pfeifer, Solingen (DE); Paul Spurk, Weiterstadt (DE); Markus Koegel, Seligenstadt (DE); Egbert S. J. Lox, Grebenhain-Hochwaldhausen (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 400 days.

(21) Appl. No.: 12/158,843

(22) PCT Filed: Nov. 22, 2006

(86) PCT No.: PCT/EP2006/011152
§ 371 (c)(1),
(2), (4) Date: Oct. 8, 2008

(87) PCT Pub. No.: WO2007/073807
PCT Pub. Date: Jul. 5, 2007

(65) Prior Publication Data
US 2009/0305874 A1 Dec. 10, 2009

(30) Foreign Application Priority Data
Dec. 24, 2005 (DE) .......................... 10 2005 062 317

(51) Int. Cl.
*B01J 21/00* (2006.01)
*B01J 29/00* (2006.01)
(52) U.S. Cl. ....................................................... 502/74
(58) Field of Classification Search .................... None
See application file for complete search history.

(56) References Cited

U.S. PATENT DOCUMENTS 5,021,204 A * 6/1991 Frost et al. ..................... 264/630
6,149,973 A * 11/2000 Foerster et al. ................ 427/235
(Continued)

FOREIGN PATENT DOCUMENTS

| EP | 0941763 | 9/1999 |
| EP | 1 229 219 | 8/2002 |
| GB | 2 299 525 | 10/1996 |

(Continued)

OTHER PUBLICATIONS

Notification of transmittal of translation on the international preliminary report on patentability (PCT/EP2006/011152).

*Primary Examiner* — Emily Le
*Assistant Examiner* — Michael Forrest
(74) *Attorney, Agent, or Firm* — Kalow & Springut LLP

(57) ABSTRACT

The invention relates to a process for coating ceramic honeycomb bodies with a coating suspension containing, in a carrier liquid, catalyst components as solids and/or in dissolved form. The honeycomb bodies have parallel flow channels running through them. The walls of the flow channels generally have an open pore structure. To coat the channel walls and in particular also the interior surfaces of the pores with the coating suspension, it is proposed that the flow channels be temporarily alternately closed and the coating suspension be forced through the open pore structure of the channel walls. The coating is subsequently dried and calcined. To close the flow channels, it is possible to use thermally or chemically decomposable or soluble compositions which are decomposed or dissolved either during calcination or by means of a subsequent chemical treatment. The coated honeycomb bodies are preferably used for the purification of exhaust gases from automobiles.

15 Claims, 5 Drawing Sheets

U.S. PATENT DOCUMENTS

| | | | |
|---|---|---|---|
| 2002/0004454 A1* | 1/2002 | Domesle et al. | 502/439 |
| 2002/0020944 A1* | 2/2002 | Yamaguchi et al. | 264/400 |
| 2006/0154816 A1* | 7/2006 | Domesle et al. | 502/439 |
| 2006/0217262 A1* | 9/2006 | Yoshida | 502/304 |
| 2007/0140928 A1* | 6/2007 | Beall et al. | 422/177 |

FOREIGN PATENT DOCUMENTS

| | | |
|---|---|---|
| WO | WO 2004/047958 | 6/2004 |
| WO | WO 2005044422 A1 * | 5/2005 |

* cited by examiner

METHOD FOR CATALYTICALLY COATING CERAMIC HONEYCOMB BODIES

FIELD OF THE INVENTION

The invention relates to a process for coating ceramic honeycomb bodies with a coating suspension containing, in a carrier liquid, catalyst components as solids and/or in dissolved form. The coated honeycomb bodies are preferably used for the purification of exhaust gases from automobiles.

BACKGROUND OF THE INVENTION

Catalysts applied in the form of a coating to honeycomb bodies have been used for decades for the purification of exhaust gases from automobiles. The honeycomb bodies have parallel flow channels for the exhaust gases running through them. Ceramic honeycomb bodies are produced from highly refractory materials. The majority are made of cordierite, a magnesium-aluminium silicate. Further ceramic materials customarily used are silicon carbide, aluminium oxide, zirconium oxide, zirconium mullite, mullite, silicon nitride, barium titanate and titanium oxide. The honeycomb bodies are produced from these materials by extrusion and generally have an open pore structure.

The flow channels run through the honeycomb bodies from an entry end face to the exit end face. The channels generally have a square cross section and are arranged in a closely spaced grid over the cross section of the honeycomb bodies. The number of flow channels per unit cross-sectional area is referred to as the cell density and can be from 10 to 200 $cm^{-2}$.

The catalytic coating of the honeycomb bodies is a dispersion coating which is applied to the honeycomb bodies using a usually aqueous suspension of the catalyst components. This coating will hereinafter also be referred to as a washcoat.

The catalyst components contain, for example, finely divided support materials having a high specific surface area to which the catalytically active components, usually the noble metals of the platinum group platinum, palladium, rhodium, iridium and ruthenium have been applied. The solids in the catalyst suspension are generally homogenized by wet milling before application to the honeycomb bodies. After milling, the solids of the suspension have an average particle size $d_{50}$ in the range from 3 to 5 µm.

Examples of support materials are simple and mixed oxides, e.g. active aluminium oxide, zirconium oxide, tin oxide, cerium oxide or other rare earth oxides, silicon oxide, titanium oxide, and silicates such as aluminium silicate or titanates such as barium or aluminium titanate and zeolites. The various phases of active aluminium oxide of the transition series, which can be stabilized by doping with silicon oxide and lanthanum oxide or else by zirconium oxide and cerium oxide, have been found to be particularly useful as heat-resistant support materials.

If reference is made in the following to coating of the honeycomb bodies with a catalytically active layer, what is meant is the coating of the channel walls of the flow channels. Coating of the outer wall of the honeycomb body is undesirable. The amount of coating applied is generally based on the external volume of the honeycomb body in gram per litre. A person skilled in the art will be sufficiently familiar with customary methods of carrying out such coatings.

To meet the necessary requirements, the coating has to have a concentration which depends on the particular task. In general, the concentration has to be greater the more active and more ageing resistant the coating is to be. In practice, from 10 to 300 g/l are required, depending on the application. However, the maximum achievable concentration can for various reasons be below the catalytically required concentration. Thus, the adhesion of the coating decreases with increasing concentration and thus layer thickness. Furthermore, high layer thicknesses reduce the hydraulic diameter of the flow channels and thus increase the exhaust gas counter-pressure (back pressure) of the catalyst.

There are applications, for example the oxidation of hydrocarbons and carbon monoxide in diesel exhaust gas ("diesel oxidation catalyst"), in which only a relatively low mass of catalyst in the range from 100 to 200 g per litre of honeycomb body volume is necessary for the reaction. A further increase in the mass of catalyst while maintaining the total noble metal content is in this case not associated with an activity advantage. In the case of other catalytic reactions, for example the storage and reduction of nitrogen oxides ("nitrogen oxide storage catalyst") or the selective catalytic reduction of nitrogen oxides by means of ammonia ("SCR catalyst"), on the other hand, an increase in the mass of active material is desirable but is possible only within limits because of the abovementioned problems with the adhesion of the coating and the back pressure of the finished catalyst.

To reduce the high back pressure, U.S. Pat. No. 5,334,570 proposes relocating the catalytic coating into the pores of ceramic honeycomb bodies. The ceramic honeycomb bodies used in this patent had an open porosity of from 30 to 45% and an average pore diameter of from 3 to 10 µm. For this reason, catalyst materials which have colloidal particle diameters in the range from 0.001 to 0.1 µm, preferably from 0.001 to 0.05 µm, and penetrate into the pores of the honeycomb bodies when the honeycomb bodies are brought into contact with a corresponding colloidal coating dispersion were used for catalytic coating. According to the patent, the honeycomb bodies were dipped into the coating dispersion in order to contact them with the coating dispersion. In this way, from 90 to 95% of the colloidal washcoat particles could be deposited in the pores of the honeycomb bodies, so that the cross section of the flow channels was barely reduced by the coating and the back pressure was therefore increased only insignificantly.

Ceramic honeycomb bodies having a significantly increased porosity of from about 60 to 65% and average pore diameters of from 10 to 20 µm have been developed in recent years. The objective here was to make the channel walls permeable to the catalyst particles so that the particles can deposit not only as a layer on the channel surface but also in the pore system of the wall. It is therefore possible to achieve lower layer thicknesses for a comparable mass of catalyst or, conversely, higher loading concentrations at equal catalyst layer thickness [Tao et al., SAE 2004-01-1293].

To coat honeycomb bodies, the catalytically active, water-insoluble, pulverulent components are usually suspended in water or an organic liquid, milled and the substrate is subsequently coated by dipping into the suspension, by pouring the suspension over it or by sucking in or pumping in the suspension.

If the above-described, newly developed porous honeycomb bodies are used here, part of the catalytically active substances actually penetrates into the pore system of the honeycomb body and deposits there. However, the processes described do not allow the pores of the honeycomb body to be filled completely and thus be optimally utilized.

SUMMARY OF THE INVENTION

It is an object of the present invention to provide a process for coating porous honeycomb bodies which allows both the geometric surfaces of the flow channels and the pores of the channel walls to be coated in a defined manner with a catalyst. The objective is to increase the amount of catalytically active components in the walls of the honeycomb bodies for optimizing the back pressure behaviour after coating with an equal mass of catalyst or to increase the active mass at a comparable back pressure behaviour after coating.

The process uses ceramic honeycomb bodies through which parallel flow channels separated from one another by channel walls having an open pore structure run from an entry end face to an exit end face. Coating is carried out using a catalyst suspension containing solids suspended in a carrier liquid. The process is characterized in that the flow channels are alternately temporarily closed at the entry and exit end face, the catalyst suspension is allowed to flow through the honeycomb body from the entry face to the exit face and the alternately closed flow channels are subsequently opened again.

DETAILED DESCRIPTION OF THE PREFERRED EMBODIMENTS

Figure 1:
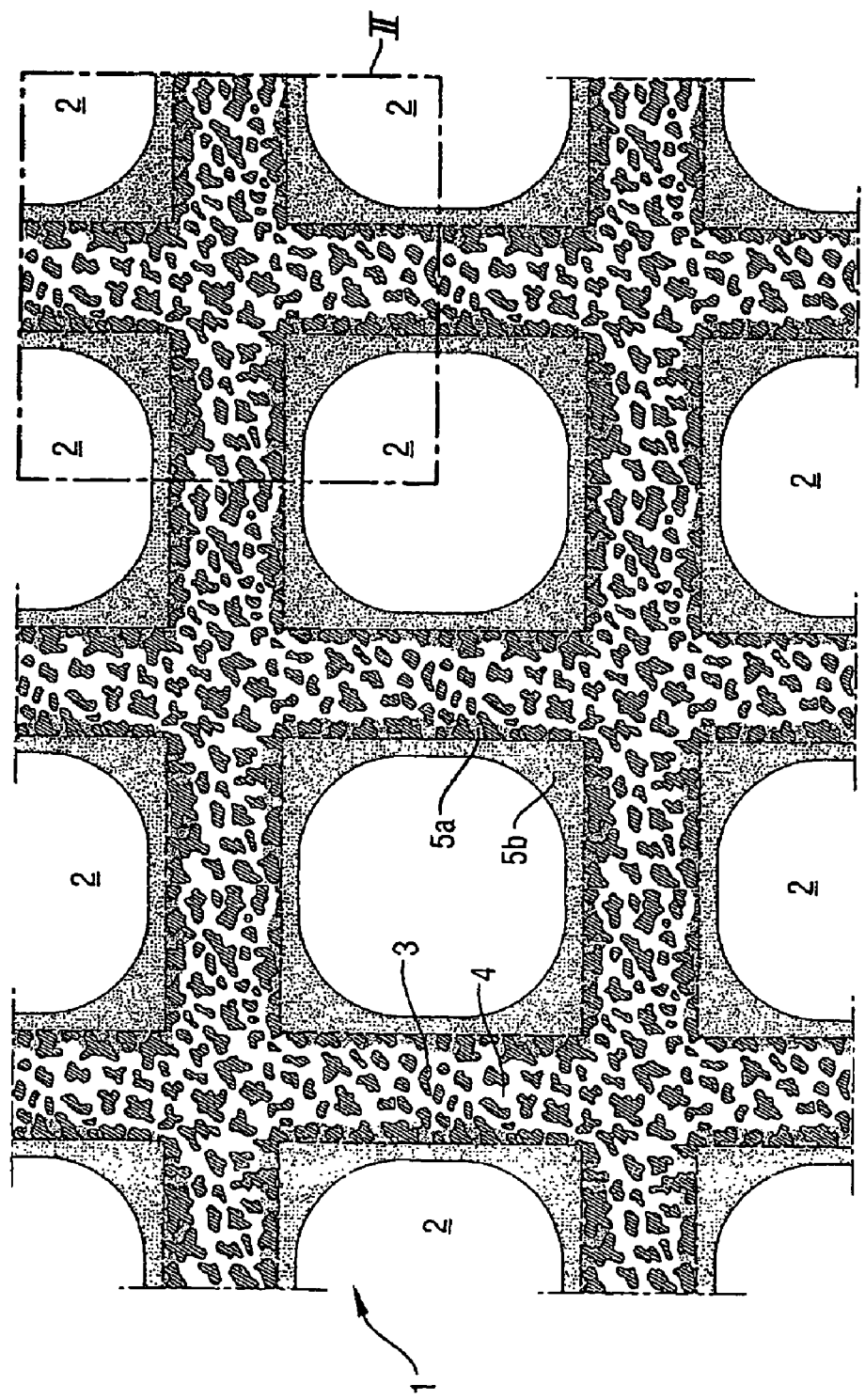
FIG. 1: drawing based on photographs of a transverse section through a conventionally coated honeycomb body as per Comparative Example 1

For the purposes of the present invention, the term honeycomb bodies refers to flow-through honeycomb bodies whose flow channels are open at both ends. According to the invention, these flow channels are temporarily alternately closed at the entry and exit end face for the purpose of carrying out coating. These are in contrast to wall-flow honeycomb bodies whose flow channels are permanently alternately closed at the entry and exit end face.

In contrast to conventional coating processes for honeycomb bodies, the present process forces the coating suspension to flow through the pore system of the material of the channel walls during the coating procedure. In this way, the surfaces of the pores are coated in a targeted manner. Depending on the particle size distribution of the solids in the coating suspension and on the average pore diameter of the ceramic material of the honeycomb body, this results in more or less pronounced filtration of the coating suspension. It is thus possible to set the mass ratio of the coating suspension deposited in the pores to the coating suspension deposited on the channel walls in a defined manner by appropriate choice of the particle size distribution. However, preference is given to filling the pores of the channel walls as completely as possible with catalyst composition in order to keep the coating on the wall surfaces as low as possible at the desired coating concentration. At an appropriately low coating concentration, it is even possible to accommodate all of the catalyst composition in the pores.

The catalyst suspension can be sucked through or pumped through the honeycomb bodies. As an alternative, the honeycomb bodies can be dipped into the catalyst suspension or have the catalyst suspension poured over them, as long as it is ensured that in this procedure the coating suspension has to pass through the channel walls.

The temporary alternate closure of the flow channels is effected using the methods known for producing alternately closed wall flow filters. As in the case of wall flow filters, the thickness of the temporary closure is restricted to a few millimetres.

The sealing compositions are not subject to any restrictions. They merely have to be able to be introduced into the flow channels by known methods and be solid at the usual working temperatures for coating honeycomb bodies. The honeycomb bodies are usually coated at room temperature. Suitable sealing compositions are, for example, compositions which melt or vaporize at elevated temperature, preferably above 80° C., can be dissolved out by means of solvents or can be decomposed thermally or reacted chemically. The latter category includes, in particular, organic sealing compositions which can either be burnt or ashed. Suitable compositions of this type are, for example, water-insoluble fillers which can be burnt out, e.g. natural or synthetic waxes, in particular paraffin wax, or polymers such as polyethylene wax. Preference is given to waxes having a melting point above 80° C.

Honeycomb bodies suitable for the process of the invention are in general all porous honeycomb bodies having open porosity. Depending on the average pore size, the solids of the coating dispersion have to have a correspondingly small particle diameter. In the case of average pore sizes in the range from 3 to 10 μm, preference is given to using solids having average particle diameters in the colloidal range (<1 μm). However, solids having an average particle size $d_{50}$ in the range from 3 to 5 μm or from 1 to 3 μm are also suitable. It is, however, also possible to use solids having a wide particle size range or solids having a multimodal particle size distribution. Filtration then occurs during coating: particles having small particle diameters are deposited in the pores of the honeycomb body while the larger particles are deposited on the channel walls.

However, preference is given to using highly porous honeycomb bodies having a porosity in the range from 30 to 90% and an average pore diameter in the range from 10 to 50 μm.

The process of the invention allows, compared to standard honeycomb bodies, more catalytically active composition to be applied to the support at a comparable layer thickness on the channel surface or at a comparable hydraulic diameter of the flow channel.

Figure 4:
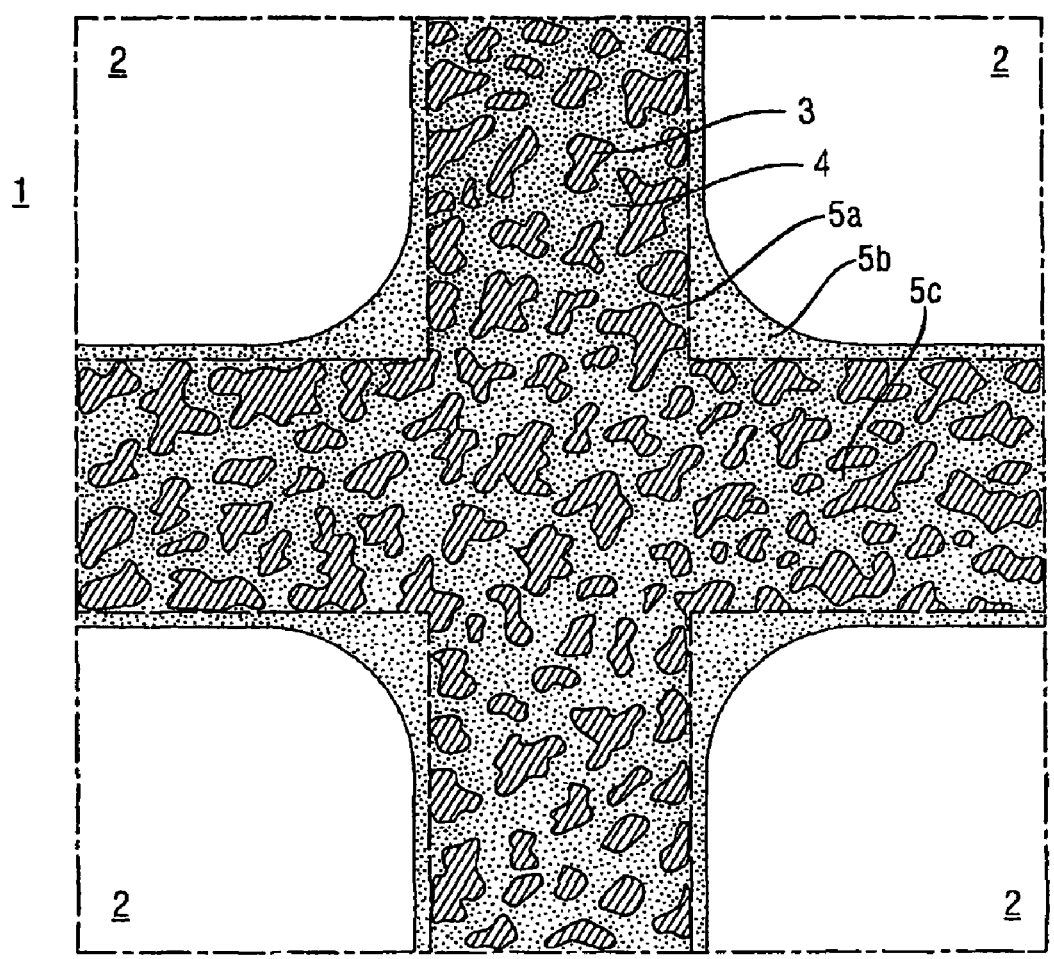
FIG. 4: part IV of FIG. 3
FIG. 5: back pressure as a function of flow for three honeycomb bodies:
  A) uncoated honeycomb body;
  B) honeycomb body coated according to the invention; and
  C) conventionally coated honeycomb body.
Figure 5:
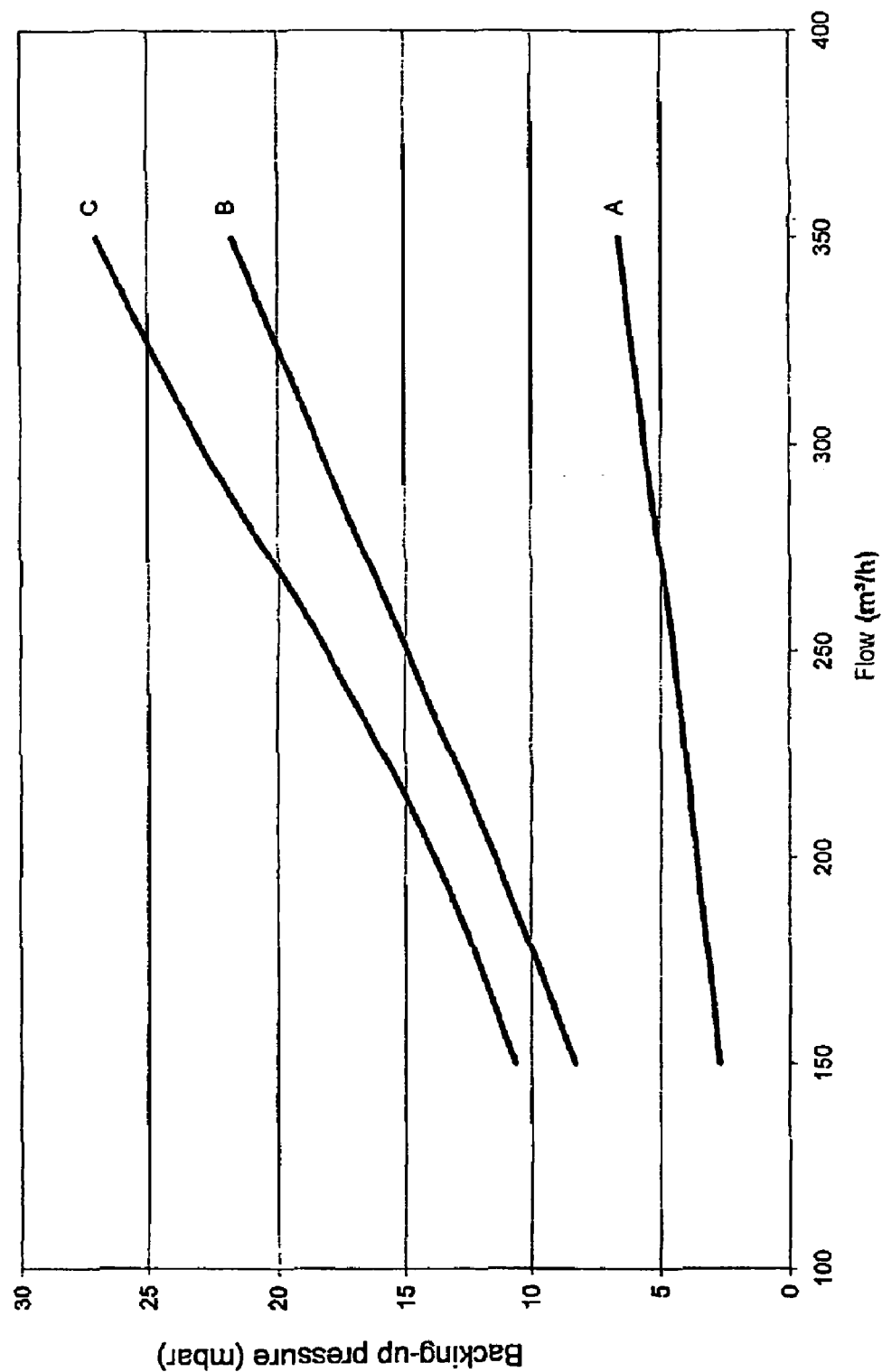

The following examples and FIGS. 1 and 5 illustrate the invention. The figures show
FIG. 1: drawing based on photographs of a transverse section through a conventionally coated honeycomb body as per Comparative Example 1
FIG. 2: part 11 of FIG. 1
FIG. 3: drawing based on photographs of a transverse section through a honeycomb body coated according to the invention as per Example 1
FIG. 4: part IV of FIG. 3
FIG. 5: back pressure as a function of flow for three honeycomb bodies:
  A) uncoated honeycomb body
  B) honeycomb body coated according to the invention
  C) conventionally coated honeycomb body

EXAMPLE 1

The flow channels of a cordierite honeycomb body were closed alternately by means of a paraffin wax. The honeycomb body had a diameter of 14.4 cm, a length of 15.24 and a cell density of 46.5 cm$^{-2}$ and a thickness of the channel walls of 0.3 mm. The porosity of the material was 65% at an average pore diameter of 22 μm.

This honeycomb body was coated with a conventional SCR catalyst comprising a titanium dioxide powder on which 1.5% by weight of vanadium pentoxide and 9.3% by weight of tungsten had been deposited. For this purpose, the titanium oxide powder was suspended in water and milled by means of a Dyno mill to an average particle diameter $d_{50}$ of less than 1 μm and $d_{90}$ of <3 μm. This suspension was pumped through the honeycomb body and excess washcoat was sucked out at the rear side of the filter by application of a vacuum. Repetition of this procedure one more time resulted in the honeycomb body being coated with an amount of catalyst of 240 g per litre of honeycomb body volume. After coating, the honeycomb body was dried and calcined so that the alternate paraffin seals of the flow channels were melted and burnt.

COMPARATIVE EXAMPLE 1

For comparison, a honeycomb body identical to that in Example 1 was coated with the catalyst suspension without prior alternate closure of the flow channels, dried and calcined. The mass of catalyst after coating was 234 g/l.

To examine the layer thickness distribution, transverse sections of the catalysts were prepared and examined in a scanning electron microscope. Drawings of corresponding photographs are shown in FIGS. 1 to 4.

Figure 2:
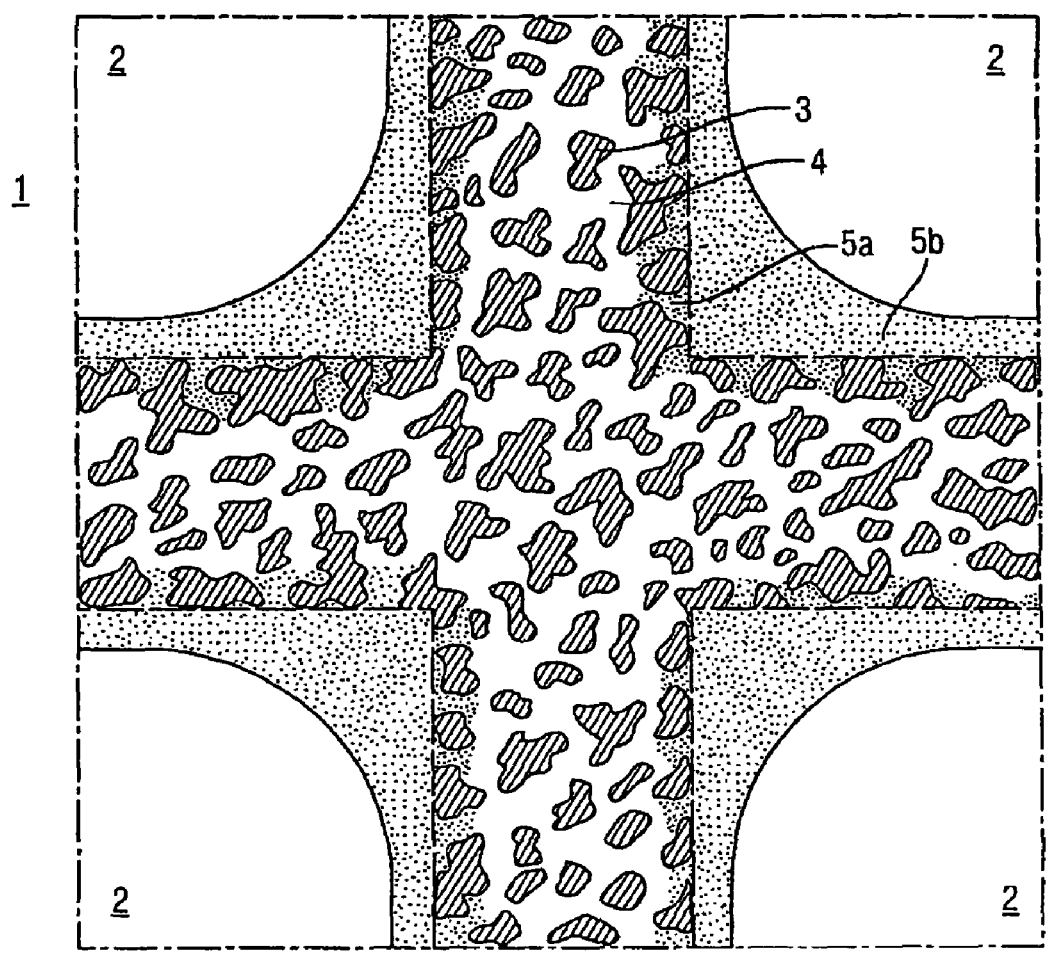
FIG. 2: part II of FIG. 1
FIG. 3: drawing based on photographs of a transverse section through a honeycomb body coated according to the invention as per Example 1

FIG. 1 shows a cross section of the honeycomb body (1) coated as described in Comparative Example 1. FIG. 2 shows an enlargement of part 11 of FIG. 1. The reference numeral (2) denotes the flow channels of the honeycomb body and (3) denotes its cordierite framework having the pores (4). Virtually all the catalyst material is present as coating (5b) on the channel walls. Only a small part (5a) has penetrated into the pores of the cordierite framework in the surface region of the channel walls.

Figure 3:
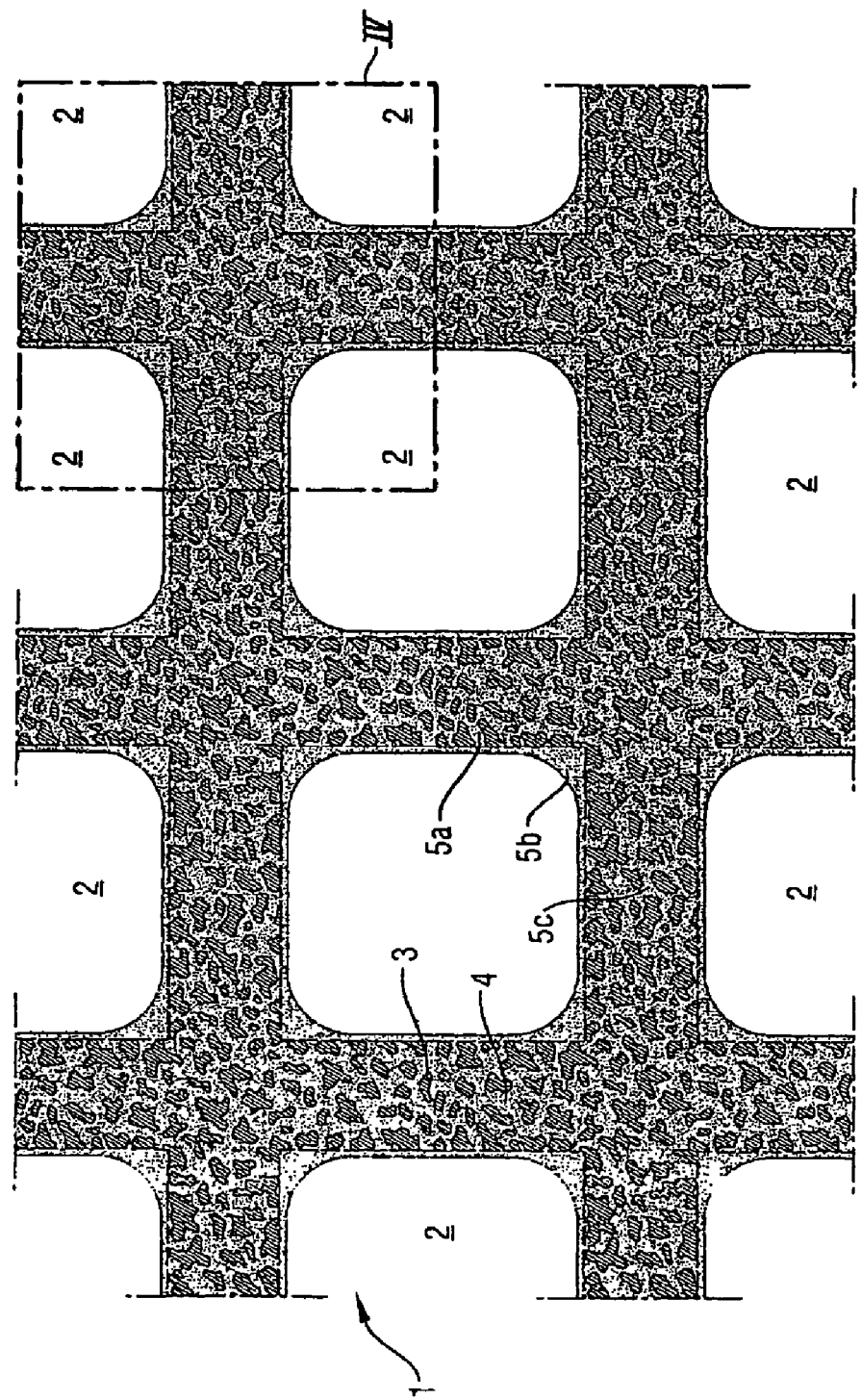

FIGS. 3 and 4 show the cross sections corresponding to FIGS. 1 and 2 for the catalyst coated as described in Example 1. As a result of the coating suspension being pumped through the channel walls bounding the flow channels, the pores of the cordierite framework have been filled with catalyst material both in the interior of the channel walls (5c) and in the surface region of the channel walls (5a). Further coating material (5b) is present on the channel walls since, at the chosen coating concentration of about 240 g/l, it is not possible for the entire catalyst material to be accommodated in the pores of the channel walls.

EXAMPLE 2

To measure the back pressure of honeycomb bodies according to the invention and conventionally coated honeycomb bodies, two further honeycomb bodies having the same dimensions as in the above examples were coated with an iron-exchanged zeolite by methods analogous to Example 1 and Comparative Example 1. The coating concentration on the honeycomb body coated according to the invention was 330 g/l of honeycomb body volume and that on the conventionally coated honeycomb body was 327.5 g/l.

The back pressure caused by these honeycomb bodies was measured as a function of the flow of air through the body. An uncoated honeycomb body was also examined for comparison. The results of these measurements are shown in FIG. 5. Curve A is the back pressure for the uncoated honeycomb body, curve B is that for the honeycomb body coated according to the invention and curve C is that for the conventionally coated honeycomb body.

The honeycomb body coated according to the invention displays a significantly lower back pressure than the conventionally coated honeycomb body. Although only a small proportion of the coating composition can be taken up by the pores in the channel walls at the chosen coating concentration of greater than 300 g/l, this has a very positive effect on the back pressure.

What is claimed is:

1. Process for the catalytic coating of ceramic honeycomb bodies through which parallel flow channels separated from one another by channel walls having a surface and an open pore structure run from an entry end face to an exit end face, in which coating is carried out using a catalyst suspension containing solids suspended in a carrier liquid, characterized in that the flow channels are alternately temporarily closed at the entry and exit end face, the catalyst suspension is allowed to flow through the honeycomb body from the entry face to the exit face so as to completely fill pores of the channel walls with the catalytic coating and reduce the catalytic coating on the surface of the channel walls and the alternately closed flow channels are subsequently opened again.

2. Process according to claim 1, characterized in that the catalyst suspension is sucked or pumped through the honeycomb body.

3. Process according to claim 1, characterized in that the honeycomb body is dipped into the catalyst suspension or the catalyst suspension is poured over it.

4. Process according to claim 2, characterized in that the flow channels are alternately closed by means of a sealing composition which is solid at the customary working temperatures in the coating of honeycomb bodies and melts or vaporizes at elevated temperature, can be dissolved out by means of solvents, can be decomposed thermally or can be reacted chemically.

5. Process according to claim 4, characterized in that a natural or synthetic wax which has a melting point above 80° C. and burns during calcination of the coated honeycomb body is used as sealing composition.

6. Process according to claim 1, characterized in that the honeycomb bodies have a porosity in the range from 30 to 90% and an average pore diameter of from 10 to 50 μm.

7. Process according to claim 1, characterized in that the solids of the suspension have an average particle size $d_{50}$ in the range from 3 to 5 μm.

8. Process according to claim 1, characterized in that the solids of the suspension have an average particle size $d_{50}$ in the range from 1 to 3 μm.

9. Process according to claim 1, characterized in that the solids of the suspension have an average particle size $d_{50}$ of less than 1 μm.

10. Process according to claim 4, characterized in that the sealing composition is melted and burnt.

11. Process for the catalytic coating of ceramic honeycomb bodies through which parallel flow channels separated from one another by channel walls having a surface and an open pore structure run from an entry end face to an exit end face, in which coating is carried out using a catalyst suspension containing solids suspended in a carrier liquid, characterized in that the flow channels are alternately temporarily closed at the entry and exit end face, the catalyst suspension is allowed to flow through the honeycomb body from the entry face to the exit face so as to completely fill pores of the channel walls with the catalytic coating and reduce the catalytic coating on the surface of the channel walls and the alternately closed flow channels are subsequently opened again, the flow channels being alternately closed by means of a sealing composition which: (i) is solid at working temperatures in the coating of honeycomb bodies and melts or vaporizes at elevated temperature above the working temperatures; (ii) can be dissolved out by means of solvents; and (iii) can be decomposed thermally or can be reacted chemically.

12. Process for the catalytic coating of ceramic honeycomb bodies through which parallel flow channels separated from one another by channel walls having a surface and an open pore structure run from an entry end face to an exit end face, in which coating is carried out using a catalyst suspension containing solids suspended in a carrier liquid, characterized in that the flow channels are alternately temporarily closed at the entry and exit end face, the catalyst suspension is allowed to flow through the honeycomb body from the entry face to the exit face so as to completely fill pores of the channel wall with the catalytic coating and reduce the catalytic coating on the surface of the channel walls and the alternately closed flow channels are subsequently opened again, the honeycomb bodies having a porosity in the range from 30 to 90% and an average pore diameter of from 10 to 50 μm.

13. Process for the catalytic coating of ceramic honeycomb bodies through which parallel flow channels separated from one another by channel walls having a surface and an open pore structure run from an entry end face to an exit end face, in which coating is carried out using a catalyst suspension containing solids suspended in a carrier liquid, characterized in that the flow channels are alternately temporarily closed at the entry and exit end face, the catalyst suspension is allowed to flow through the honeycomb body from the entry face to the exit face so as to completely fill pores of the channel walls with the catalytic coating and reduce the catalytic coating on the surface of the channel walls and the alternately closed flow channels are subsequently opened again, the solids of the suspension having an average particle size $d_{50}$ in the range from 3 to 5 μm.

14. Process for the catalytic coating of ceramic honeycomb bodies through which parallel flow channels separated from one another by channel walls having an open pore structure run from an entry end face to an exit end face, in which coating is carried out using a catalyst suspension containing solids suspended in a carrier liquid, characterized in that the flow channels are alternately temporarily closed at the entry and exit end face, the catalyst suspension is allowed to flow through the honeycomb body from the entry face to the exit face so as to completely fill pores of the channel wall with the catalytic coating and reduce the catalytic coating on the surface of the channel walls and the alternately closed flow channels are subsequently opened again, the honeycomb bodies having a porosity in the range from 30 to 90% and an average pore diameter of from 10 to 50 μm and the solids of the suspension having an average particle size $d_{50}$ in the range from 3 to 5 μm.

15. Process for the catalytic coating of ceramic honeycomb bodies through which parallel flow channels separated from one another by channel walls having a surface and an open pore structure run from an entry end face to an exit end face, in which coating is carried out using a catalyst suspension containing solids suspended in a carrier liquid, characterized in that the flow channels are alternately temporarily closed at the entry and exit end face, the catalyst suspension is allowed to flow through the honeycomb body from the entry face to the exit face so as to completely fill pores of the channel wall with the catalytic coating and reduce the catalytic coating on the surface of the channel walls and the alternately closed flow channels are subsequently opened again, the honeycomb bodies having a porosity in the range from 30 to 90% and an average pore diameter of from 10 to 50 μm and the solids of the suspension having an average particle size $d_{50}$ in the range from 3 to 5 μm, and the flow channels being alternately closed by means of a sealing composition which: (i) is solid at working temperatures in the coating of honeycomb bodies and melts or vaporizes at elevated temperatures above the working temperatures; (ii) can be dissolved out by means of solvents; and (iii) can be decomposed thermally or can be reacted chemically.

\* \* \* \* \*